United States Patent [19]

Gordon

[11] Patent Number: 4,576,115
[45] Date of Patent: Mar. 18, 1986

[54] TANK COVER

[76] Inventor: Richard A. Gordon, 95 W. 3rd St., Freeport, N.Y. 11520

[21] Appl. No.: 668,283

[22] Filed: Nov. 5, 1984

[51] Int. Cl.4 ............................................. A01K 64/00
[52] U.S. Cl. ..................................................... 119/5
[58] Field of Search ...................... 119/5; 220/306, 324

[56] References Cited

U.S. PATENT DOCUMENTS

| | | | |
|---|---|---|---|
| 1,444,367 | 2/1923 | Collamer | 119/5 |
| 2,566,004 | 8/1951 | Von Duyke | 220/306 X |
| 3,774,575 | 11/1973 | Patterson | 119/5 |
| 4,078,522 | 3/1978 | Akers | 119/5 |
| 4,313,048 | 1/1982 | Holbrook | 119/5 X |

FOREIGN PATENT DOCUMENTS 988375  5/1976  Canada .................................... 119/5

Primary Examiner—Robert P. Swiatek
Attorney, Agent, or Firm—Bauer & Amer

[57] ABSTRACT

A cover for an animal tank, fish tank or the like having an open top, and peripheral side portions having an exterior peripheral lip. The cover is formed of a flat screen attached to a continuous frame, which is provided with a plurality of resilient depending tabs having inwardly directed flanges which are adapted to engage beneath the lip of the tank, and are biased into engagement with the side portion of the top of the tank to lock the flange and lip together and secure the cover on the tank.

11 Claims, 7 Drawing Figures

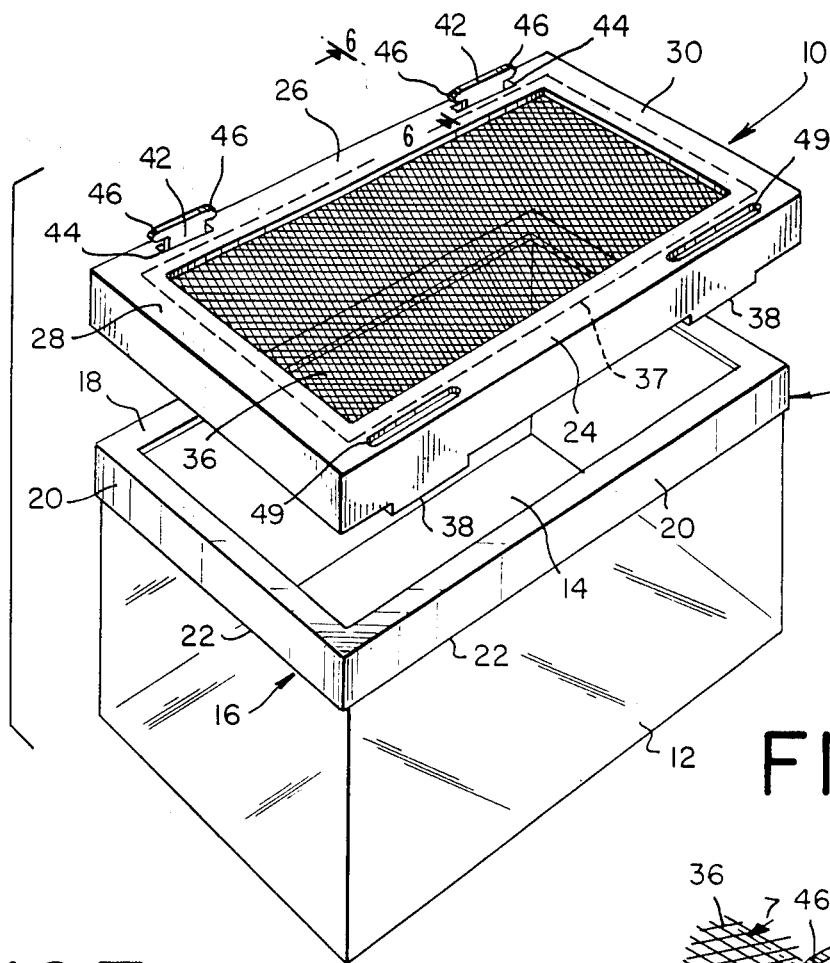
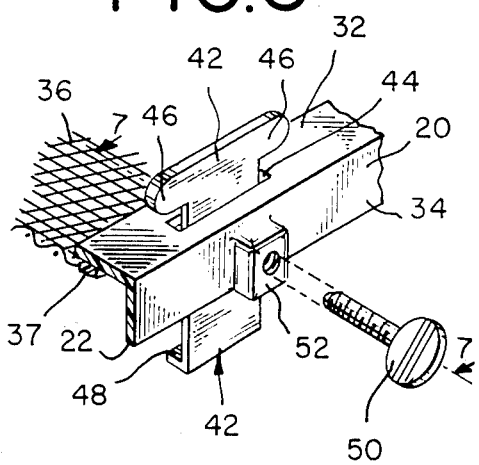
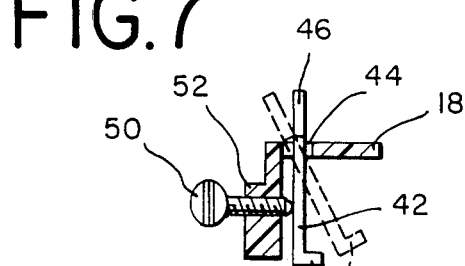
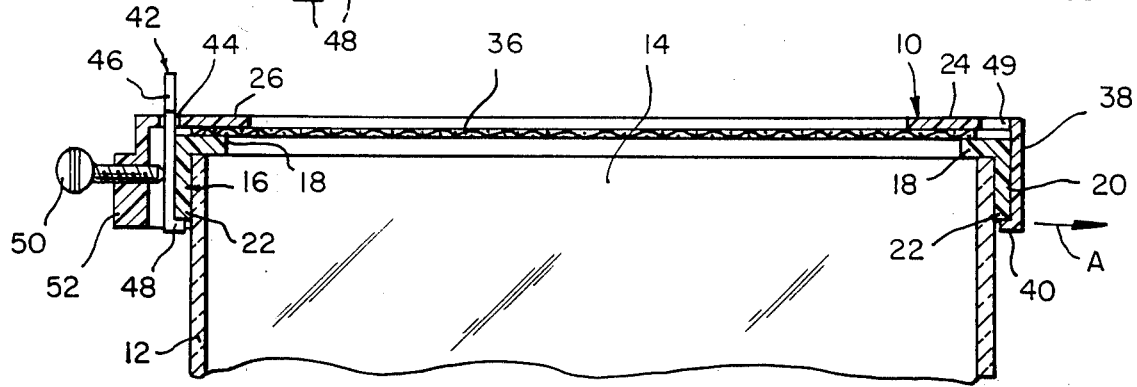

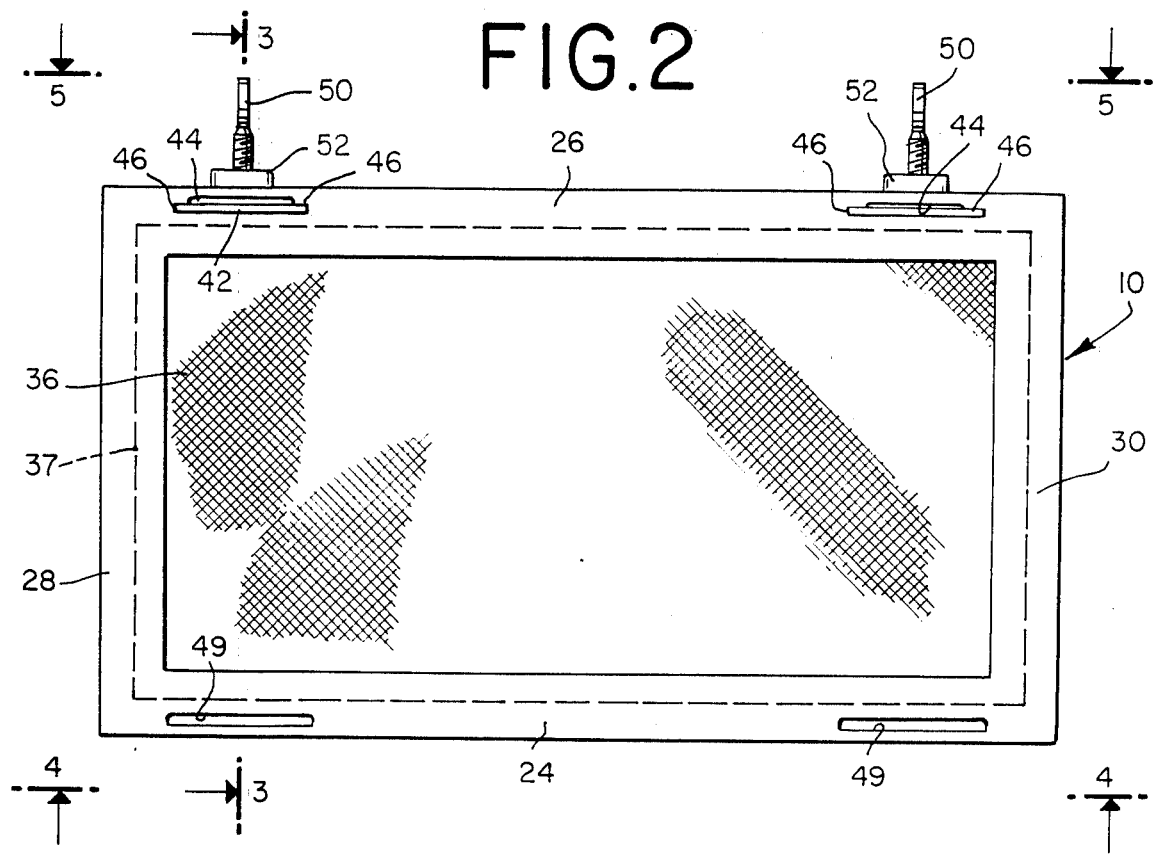
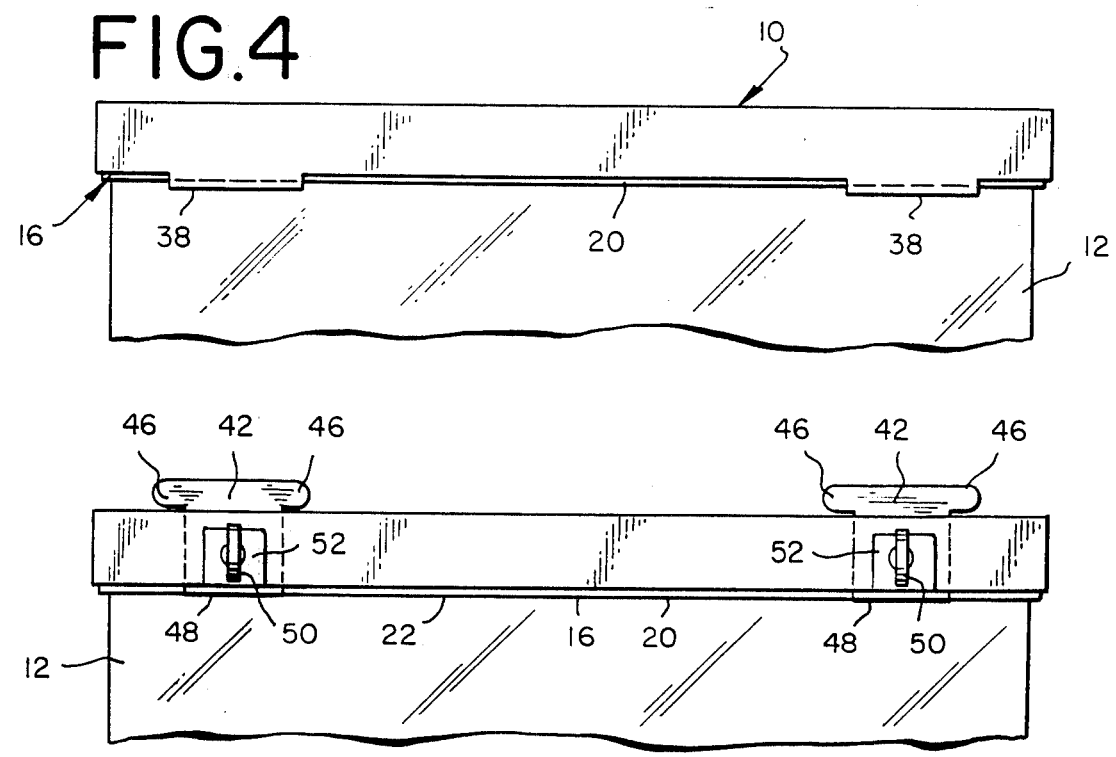

TANK COVER

BACKGROUND OF THE INVENTION

The present invention is directed to a cover for a tank, as an animal tank, fish tank or the like and particularly to a cover which may be easily installed over the tank and easily removed therefrom and which in the installed position is secured thereto so that it may not be inadvertently dislodged or removed.

It is well known that tanks, as fish tanks and animal tanks require covers, which, while permitting normal communication with the atmosphere, enclose the tanks so that the animals or fish therein cannot lift or displace the same and escape therefrom or that foreign matter can not inadvertently be thrown or dropped into the tanks. On the other hand, the cover must be easily removable so that access to the tank for feeding the animals or fish or for cleaning the tank can be accomplished.

It is the object of the present invention to provide a cover for fish tanks, animal tanks and the like which satisfies the requirements indicated above. It is a further object of the present invention to provide a cover which may be firmly secured to the tank against inadvertent removal and yet which can be easily released and removed for the necessary access to the tank.

The foregoing objects, together with other objects and advantages, will be apparent from the following disclosure of the present invention.

SUMMARY OF THE INVENTION

According to the present invention a cover is provided for the tank that may be used or any purpose, as an animal tank, fish tank or the like which has an open top, and peripheral side portions having an exterior peripheral band or lip. The cover consists of a flat screen attached integral to a continuous frame, the cross section of which comprises a horizontal wall adapted to rest on top of the tank and a vertical wall adapted to fit over the peripheral side portion of the top of the tank. The frame is provided with a plurality of resilient depending tabs fixed to the frame and having inwardly directed flanges which are adapted to engage beneath the lip of the tank. Means are provided for biasing some of the tabs into engagement with the side portion of the top of the tank to lock the flange and lip together and secure the cover on the tank.

In the preferred embodiment of the invention, the tabs, which are biased, are separately formed and depend freely through a slot in the frame between the vertical wall thereof and the tank on the side opposite the resilient tabs, while the fixed resilient tabs which are not biased, are integrally formed with the frame itself. The fixed resilient tabs and the biased tabs are arranged in aligned pairs on opposite sides of the frame, respectively. The biasing means comprises a screw threaded through the vertical wall of the frame into engagement with the associated freely movable tab so as to push the tab inwardly, thus pulling the frame in an opposite direction, causing simultaneous engagement of the flange and lip of that biased tab against which the screw acts, as well as those of the fixed resilient tabs of the opposite side of the frame.

The tabs have the necessary degree of flexibility relative to the frame so that those fixed tabs which are not provided with the biasing means can be manually released from engagement beneath the lip so that the cover can be removed and lifted free of the tank and returned into locking engagement with it without disturbing the biasing means itself.

Full details of the present invention are set forth in the following disclosure and illustrated in the accompanying drawings.

BRIEF DESCRIPTION OF THE DRAWINGS

In the drawings:

FIG. 1 is a perspective view, partially exploded, of a tank having a cover formed in accordance with the present invention;

FIG. 2 is a plan view of the cover shown in FIG. 1;

FIG. 3 is a sectional view taken lines 3—3 of FIG. 2;

FIG. 4 is a side elevational view taken in the direction of 4—4 of FIG. 3, with the cover in place on the tank;

FIG. 5 is a view similar to that of FIG. 4 taken along the direction 5—5 on the opposite side of the tank and cover;

FIG. 6 is an enlarged perspective view taken in the direction of line 6—6 of FIG. 1, showing retaining means for the frame; and, FIG. 7 is a sectional view along lines 7—7 of FIG. 6.

DESCRIPTION OF THE INVENTION

As seen in the Figures, the present invention is directed to a cover generally depicted by the numeral 10 that may be used for any animal or fish tank 12. The tank 12 is illustrated here as a rectilinear parallelepiped although other shapes can be employed. The tank 12 is formed with an open top 14 which is provided around its periphery with a reinforcing rim or band 16, which strengthens the open top. The band 16, as illustrated in FIG. 3, has an angular cross-section providing a horizontal edge 18 that generally overlies the the top of the tank 12 and a vertical peripheral edge wall 20 depending a short distance downward reinforcing along the side of the tank and forming an inwardly extending lip 22.

The tank 12 itself may be made of glass or transparent plastic while the band 16 may be made of plastic, aluminum or other metals, suitably adhered to the tank walls. When the band 16 is plastic, it can be integrally molded with the tank walls or separately applied thereto. On the other hand, the tank walls along the upper edge may be thickened to provide an inwardly extending lip 22, thereby obviating the need for a separate band. In any event, however, the tank is formed with a lip 22 at least along a substantial portion of a pair of its oppositely disposed side walls. The function of the lip 22 will become obvious from the following description of the cover.

In its rectangular shape, the cover 10 comprises a frame having parallel front and rear border members 24 and 26 respectively and side members 28 and 30 respectively all unitarily joined at their corner ends. Each of the border members 24-30 has a similar cross section as seen in FIG. 6 comprising a horizontal wall 32 and an integral vertically depending skirt wall 34. A screen 36 is stretched horizontally across the frame and is permanently integrally secured to the inner or undersurface of the horizontal walls 32 about its entire periphery at 37 by any desired means. In practice, the frame 10 is molded of plastic that is heat welded to the screen by passing through and securing to the pores of the open mesh thereof. The cover 10, of course, conforms loosely to the shape of the opening of the tank 12 and is adapted to fit over the top of the tank so that its horizontal walls 32 rest on the upper edge of the tank and its vertical skirt walls 34 depend over the sides of the bands 16 thus closing the top of the tank.

The front border member 24 of the cover frame 10 is provided with a pair of fixed tabs 38 molded integrally and formed unitary with the skirt wall 34. The tabs 38 extend below the bottom edge of wall 32, a distance to extend at least to engage the lip 22 of the band 16 and each is provided with an inwardly directed flange 40 which is adapted to engage and hook beneath the lip 22. Depending from the horizontal wall 32 of rear border member 26 of the cover 10, and in opposition to the tabs 38 are a pair of freely movable tabs 42 seen in detail in FIG. 6. The tabs 42 depend from the horizontal wall 32, free of and on the interior side of the vertical skirt wall 34 so as to be interposed between this skirt wall 34 and the band 16. Preferably the tabs 42 are separately formed from the frame member, comprising a flat piece of plastic or metal which extends through a slot 44 formed in the horizontal wall, these tabs being provided with laterally extending wings 46 preventing them from falling through the slots 44. Along their lower edge, the tabs 42 are formed with inwardly directed flanges 48 which are also designed to engage beneath and hook with the lip 22 of the band 16.

Associated with each of the tabs 42 on the rear border of the frame is a thumb screw 50, threaded through a nut or boss 52 fixed to or integrally formed with the vertical skirt wall of the frame. The screw 50 points directly at the back of the tab 42 and when threaded closed thereagainst is adapted to push the tab 42 inwardly toward the band 16 so that flange 48 securely engages under the lip 22 of the band and locks firmly thereunder. FIG. 7 illustrates the degree to which the tab 42 can move, as well as its ability to move freely in the slot 44. As a result of the locking of the tabs 48 by the thumb screw 50, the counterforce against the tank causes the front end of the frame to be pushed to the rear, causing the fixed integrally formed tabs 38 along the front border of the frame to automatically engage beneath the lips 22. Thus, the cover 10 can not be lifted off the tank 12 when the fixed tabs 38 and movable tabs 42 are threaded closed against the rim or lips 22.

On the other hand, the cover 10 can be removed when desired. The tabs 38, formed along the front edge of the frame 10 are themselves resilient and flex along their lengths. They can thus be manually pulled in the direction of arrow A shown in FIG. 3 so that their flanges 40 can be disengaged from the lip 22. Once this is accomplished, the entire frame can be tilted rearwardly for displacing tabs 42 on the rear border of the frame from their own engagement with the lips 22 allowing the frame to be removed.

It is noted that to remove the cover, the thumb screws 50 need not be disturbed or loosened or themselves unscrewed. Thus, when once set in their engaging mode or position, the tabs 42 can remain so and still the cover 10 can be removed from and returned quickly to the tank simply by flexing the fixed locking tabs 38. To facilitate this without unduly flexing the body of the tabs in excess of their modulus of elasticity, the horizontal wall 32 is provided with a weakened portion by providing slots 49 in the area of the tabs 38. This enables the frame to flex with the unitarily formed tabs 38 when they are manually displaced to absorb such stressing forces along the greater area of the frame rather than concentrating them on the tabs alone.

Similarly, the cover may be returned to its fixed position on the tank 12 by reversing the operation, i.e., by placing the rear tabs 42 in engagement over the lip 22 and closing the cover in a typical downward motion such as if it were a hinged lid. The tabs 38 along the front border of the frame, and the frame itself being resilient, ride over the band 16 along the front of the tank, until the flanges 40 snap over the lips 22. It will also be noted at this point that the position of adjustment of the thumb screw 50 need not be changed to reinstall the cover on the tank. The cover can be repeatedly opened and closed and be removed from the tank while maintaining the thumb screws 50 in their locked position and each time the cover will be firmly secured in place on the tank.

As will be seen from FIGS. 6 and 7, it is preferable that those tabs 42 which are to be biased by the thumb screw 50 are separate members which hang freely through the slots 44. This allows the thumbs screw to move the tabs in a wide arc as shown in FIG. 7. However, the tabs 42 may be integrally formed with the frame member so as to fixedly depend from the horizontal wall provided of course that the frame has sufficient resiliency and flexibility enabling the tabs to undertake their swinging movement as indicated in FIG. 7.

It is noted that the side borders 28 and 30, respectively are formed without any tabs whatsoever and are simple in their construction. However, the tabs 38 and 42 can be arranged around these narrower sides rather than the longer front and the rear borders if desired.

The embodiment illustrated shows the tabs on the front border and the tabs on the rear border of the frame laying in paired opposition to each other. In another form, the tabs on the front border may be congregated inwardly to its center from the side borders, or even replaced with a single tab. In each instance, the pressure exerted by the biasing means at the rear will cause the frame to move rearwardly locking the flanges on the front border below the lip. So long as substantial exertion of force and placement of the tabs is made, front to rear, on the frame, the cover will securely seat and lock into place. Also while the biasing means is disclosed as a thumb screw 50, other means such as a snap, wedge, simple wedge, or the like can be used.

Various changes, modifications and embodiments have been shown and described; others will be known to those skilled in the art. Accordingly, it is intended that the foregoing description be taken as illustrative of the present invention and not limiting of the same.

What is claimed is:

1. A cover for an animal tank, fish tank or the like having an open top provided with edge portions having an exterior lip, said cover comprising a screen surrounded by a continuous frame, having front, rear and side border members, the cross section of which comprises a horizontal wall adapted to be positioned over the top of said tank and a vertical skirt wall adapted to loosely fit over the edge portion of the top of the tank, said frame having a plurality of tabs depending from front and rear border members, said tabs having means to engage the exterior lip, certain ones of said tabs being freely movable relative to their border member by passing loosely therethrough and certain others of said tabs depending fixedly from their border member, and means for biasing the movable tabs into engagement with the edge portion of the top of the tank to lock said engaging means thereof into engagement with the exterior lip so as to secure said cover on said tank.

2. A cover according to claim 1 wherein the tabs fixedly depending from the front border member are integrally formed with said border members and are sufficiently flexible so as to be manually releasable from engagement beneath said lip allowing removal of said cover without disturbance of the movable tabs and their biasing means.

3. A cover according to claim 2 wherein said border member with which said tabs are integral is provided with a weakened area to enable said border member to flex so the integral tabs may be manually displaced with respect to said tank lip for disengagement therefrom and engagement therewith.

4. A cover according to claim 1, said screen and horizontal wall being integrally secured together at the surface of said wall adapted to rest on said tank.

5. A cover for an animal tank, fish tank or the like having an open top provided with edge portions having an exterior lip, said cover comprising a screen surrounded by a continuous frame, having front, rear and side border members, the cross section of which comprises a horizontal wall adapted to rest on top of said tank and a vertical skirt wall adapted to loosely fit over the edge portion of the top of the tank, said frame having a plurality of tabs movable relative to a respective one of the front and rear border members and a plurality of resilient tabs fixedly depending from a respective one of the front and rear border members, said tabs being in paired opposition to each other, each of said tabs having inwardly directed flanges adapted to engage beneath the exterior lip, and means for biasing the movable tabs into engagement with the edge portion of the top of the tank to lock said flanges thereof into engagement with the lip so as to secure said cover on said tank, wherein said biasing means comprises a screw threadedly engaged to said vertical skirt wall into engagement with an associated tab, wherein said frame has slots in said rear border member and said movable tabs are separate from said frame and extend freely through a respective slot, said movable tabs having means on the end of the flanges preventing said movable tabs from falling through said slot.

6. A cover according to claim 5 wherein said means for preventing said movable tab form falling through said slot comprises a pair of integrally formed lateral wings.

7. A cover for an animal tank, fish tank or the like having an open top and an engageable rim comprising a screen integral with and surrounded by a continuous frame having a border member, the cross section of which comprises a horizontal wall adapted to rest on top of said tank and a vertical skirt wall adapted to loosely fit over the edge portion of the top of the tank, said frame having a plurality of resilient tabs integrally depending from the border member and a plurality of tabs movably depending from and through another portion of said border member, said movable tabs being adjustable relative to said horizontal wall, and each of said tabs having rim engaging means thereon for engagement with the engageable rim, and means for biasing the movable tabs into engagement with the tank to secure said cover on said tank and in engagement with the engageable rim.

8. A cover according to claim 7 wherein said tank is a parallelepiped having the engaging rim and said cover is shaped conformingly to said rim to seat thereover and to cover the same and is provided with said movable and integral tabs on each of a pair of opposed sides, the movable tabs on one side being in substantial alignment with the integral tabs on the opposite side, the movable tabs being adjustable relative to said engaging rim and relative to said integral tabs and the integral tabs on the other side being manually flexible to disengage the rim and release said cover.

9. A cover according to claim 8 wherein those tabs not provided with the biasing means are integrally and unitarily formed with the frame member.

10. A cover according to claim 7 wherein said screen and frame are secured together integrally against accidental separation at said horizontal wall.

11. A cover according to claim 7 wherein said tab biasing means are manually adjustable screws extending through said vertical wall into pressing engagement with a respective movable tab to press and retain said movable tab in non-removable engagement with said tank rim, and said unitarily formed tab engaging means being projections to engage said rim against unwanted displacement therefrom, and said unitary tabs being flexibly dependent from said border member for manual displacement from engagement and re-engagement with said tank rim without disturbing said movable tabs.

* * * * *